Figure 1:
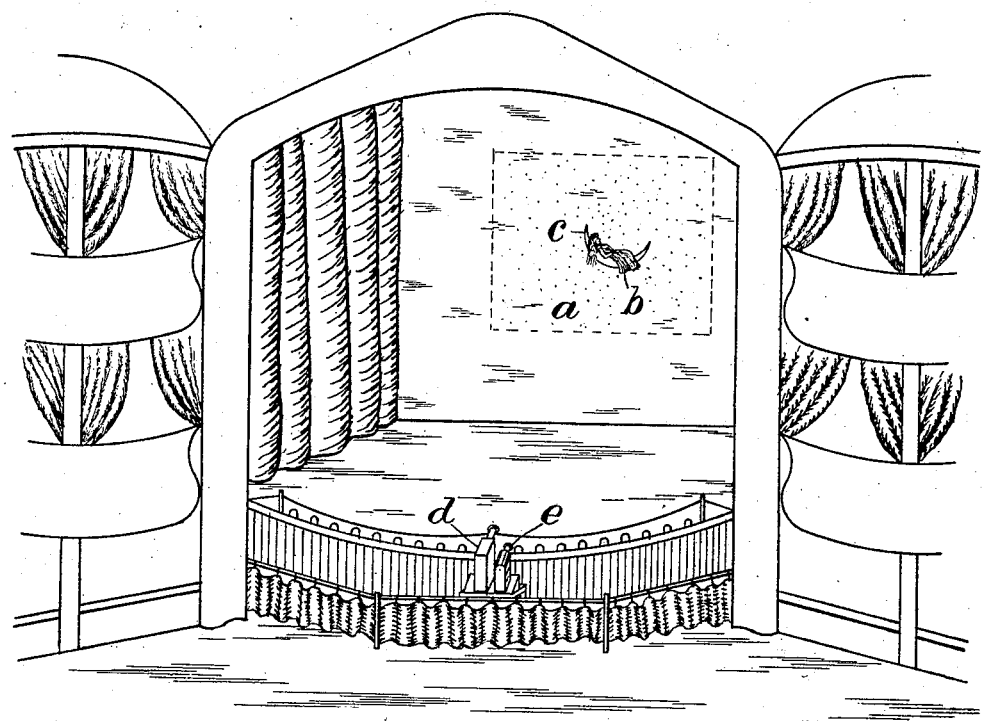

No. 688,539. Patented Dec. 10, 1901.
S. E. McMAHON.
SPECTACULAR PROJECTION.
(Application filed May 25, 1901.)
(No Model.) 2 Sheets—Sheet 1.

Attest:
L. Lee.
Walter H. Talmage.

Inventor.
Sarah E. McMahon,
per Thomas S. Crane, Atty.

No. 688,539. Patented Dec. 10, 1901.
S. E. McMAHON.
SPECTACULAR PROJECTION.
(Application filed May 25, 1901.)
(No Model.) 2 Sheets—Sheet 2.

UNITED STATES PATENT OFFICE.

SARAH E. McMAHON, OF DETROIT, MICHIGAN.

SPECTACULAR PROJECTION.

SPECIFICATION forming part of Letters Patent No. 688,539, dated December 10, 1901.

Application filed May 25, 1901. Serial No. 61,829. (No model.)

*To all whom it may concern:*

Be it known that I, SARAH E. MCMAHON, a citizen of the United States, residing at 150 Helen avenue, Detroit, county of Wayne, State of Michigan, have invented certain new and useful Improvements in Spectacular Projections, fully described and represented in the following specification and the accompanying drawings, forming a part of the same.

The present invention furnishes a means of exhibiting kinetoscope-pictures in connection with real objects in such manner that the kinetoscope-pictures may be instantly obliterated or restored to the view and may also at pleasure be caused in appearance to pass before or behind the object.

The present improvements, as will be hereinafter explained, are especially adapted to produce an appearance of aerial suspension for objects supported before a screen, and the desired effects obtained by means of my invention are wholly different from those in which kinetoscope-pictures are employed to furnish an apparently-moving background or panoramic effect in connection with an object which is not progressing.

The invention involves the use upon the front side of the screen of an object sustained close to the screen, a kinetoscope having means to uninterruptedly project the moving pictures upon the screen, and an illuminating-lantern having means to project upon the screen or object, or both, a light of sufficient intensity to efface the moving pictures. The lantern thus requires means for confining the light exclusively to the object and is necessarily placed before the screen, so as to throw the light upon the object when the light is confined to the latter alone. The light of the illuminating-lantern may be varied at pleasure, so as to be greater or less than that employed in projecting the moving pictures, to cause the moving pictures in appearance to pass before or behind the object. By limiting the bright light to the object alone the moving pictures are visible upon the screen but invisible where they pass the object, and appear, therefore, to pass behind it. By cutting off the bright light from both the object and the screen the object receives the same illumination that the background receives with the moving pictures and the pictures then appear to pass in front of the object. These illusions cause a suspended object to appear as if entirely unsupported in space, and the effect is different from that where a real or apparently moving background causes an object upon the stage to appear in rapid motion. Moving pictures which advance slowly across the screen produce the same effect of aerial suspension in my invention as those which move more rapidly, as any apparent movement of such pictures behind the object produces the appearance of aerial suspension. The light may be limited to the object alone or wholly cut off from the same and from the background by inserting suitable perforate slides behind the lens of the illuminating-lantern to confine or cut off the light in the desired manner.

I have furnished one illustration of the invention in the annexed drawings, and any other application of my invention may be made according to the taste and skill of the operator.

Figure 2:
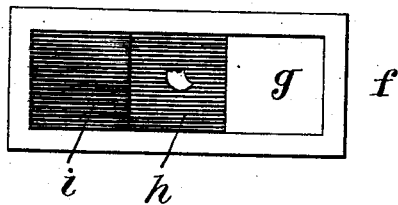
Figure 3:
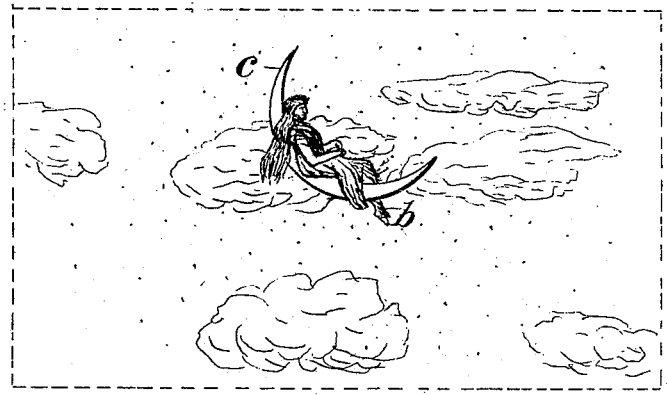
Figure 4:
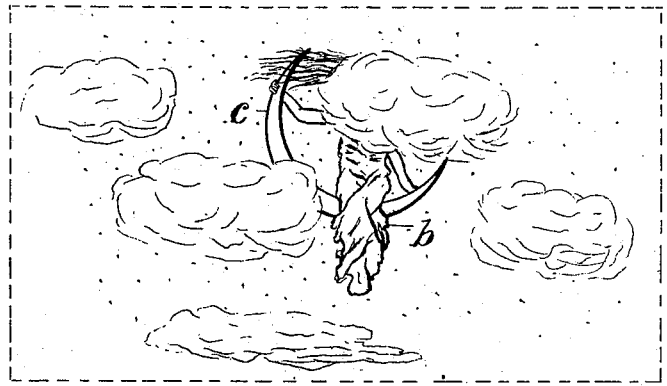

In the drawings, Figure 1 represents a stage-scene with a kinetoscope and a lantern arranged before the footlights to operate with a background and an object set in front of the screen. Fig. 2 represents a lantern-slide adapted to confine the bright light to the object only or to cut off the light entirely from such object and the background. Fig. 3 is a diagram showing one of the effects produced with the screen-setting shown in Fig. 1, and Fig. 4 shows another of such effects.

*a* designates the screen, which is formed with a light-reflecting surface adapted to exhibit kinetoscope pictures. *b* and *c* are actual objects supported close to the front side of such background, *b* representing a lunar crescent and *c* a living figure reclining upon such crescent, the crescent being made of such material and dimensions as to suitably support the figure and the whole being sustained or suspended in the air by suitable concealed connections either to the ceiling or to the framework behind the screen.

*d* designates the kinetoscope for projecting moving pictures upon the screen, and *e* an illuminating-lantern having means to throw upon the screen or object a light of sufficient intensity to efface the moving pictures when projected.

Fig. 2 represents a lantern-slide *f*, provided with three spaces, the right-hand one, *g*, being transparent, by which the light is projected over the entire screen and object, and the left-hand space *i* dark to cut off all the light. The central space *h* is darkened except a silhouette-aperture adapted to confine the light exclusively to the object. Fig. 3 represents the figure and crescent with clouds apparently passing behind the same. Fig. 4 represents the figure and crescent with clouds apparently passing in front of the same and serving to obscure the object when they pass. Such effects are produced in the following manner: The screen and the object are first brilliantly illuminated by the lantern *c*. The moving pictures are then projected upon the screen by the kinetoscope *b*, but are entirely invisible, as the bright light is proportioned to efface them. This is done by the section *g* of the slide *f*. The slide is quickly shifted in the lantern to the silhouette-opening to confine the light to the objects, which thus renders the moving pictures visible, which in the drawings are represented as clouds, and under such conditions where they pass over the brightly-lighted objects they are effaced and appear, as in Fig. 3, to pass behind the objects. Such apparent movement of the clouds behind the crescent and figure gives them the appearance of absolute suspension in space without any support whatever. The slide being shifted to the space *i* to cut off all the light from the lantern, the crescent and figure lose their superillumination and the clouds appear to pass before the objects, as shown in Fig. 4. In Fig. 1 the figure is shown reclining, as if asleep, upon the crescent and the background destitute of clouds and everything apparently quiet. The production of the moving clouds produces the impression that the crescent and figure are moving through space, and the figure is represented in Fig. 3 sitting upon the crescent and the head slightly raised, as if awakened by such movement. By increasing the velocity of the clouds' movement the apparent velocity of the crescent and figure in space is increased and the use of an electric fan to throw the hair of the figure at one side, as represented in Fig. 4, enhances this illusion, while the movement of the clouds over the objects increases the impression that the objects are passing entirely out of sight.

The method of producing moving pictures by a kinetoscope having a rapidly-moving film or negative and a rapidly-moving shutter renders it impossible to stop and start the apparatus instantaneously, while the obliteration of the moving pictures can in my invention be instantaneously effected by projecting upon the screen a light of sufficient intensity to overpower and obliterate the images of the moving pictures, while it also throws into prominence the object sustained before the screen. The essential feature of my invention is therefore the use, with a screen and an object sustained before the same, of the kinetoscope and the illuminating-lantern both arranged in front of the screen and the lantern provided with a slide adapted at pleasure to direct a strong light upon the screen to obliterate the moving pictures or to confine the strong light to the object alone.

It is evident that my invention can be used to practice various illusions, and I do not therefore limit myself to the single one illustrated in the annexed drawings.

What I claim, and desire to secure by Letters Patent, is—

1. The improvement in apparatus for scenic projections, comprising a screen to exhibit kinetoscope-pictures, an object supported upon the front side of such screen, and a kinetoscope and illuminating-lantern arranged in front of the screen, the kinetoscope having means to project continuously-moving pictures upon the screen, and the illuminating-lantern having means to project at pleasure upon the screen a light of sufficient intensity to efface the moving pictures, whereby the moving pictures may be caused to appear and disappear instantly at pleasure.

2. The improvement in apparatus for aerial projections, comprising a screen to exhibit kinetoscope-pictures, an object arranged in the air before the screen, and a kinetoscope and illuminating-lantern arranged in front of the screen, the kinetoscope having means to continuously project moving pictures upon the screen, and the illuminating-lantern having means to project at pleasure upon the object and screen a light of sufficient intensity to obliterate the moving pictures, and said lantern provided with means for confining the light at pleasure to the object alone, whereby the moving pictures are caused in appearance to pass behind the object.

3. The improvement in combining kinetoscope-pictures with real objects, which consists in placing the real object in close proximity to the front of the screen, continuously projecting kinetoscope-pictures upon the screen and object, and projecting upon the object a light alternately less and greater than that of the kinetoscope-pictures, whereby the pictures are caused to pass in appearance alternately before and behind the object.

4. The improvement in combining kinetoscope-pictures with real objects to produce an appearance of aerial suspension, which consists in supporting a real object in the air in close proximity to the front of the screen, continuously projecting the kinetoscope-pictures upon the object and upon the screen, and projecting upon the object a light alternately greater and less than that of the kinetoscope-pictures whereby the moving pictures are caused in appearance to pass before and behind the object.

5. The method of combining moving pictures with relatively stationary objects, which consists in sustaining the object in close proximity to the front of the screen, continuously projecting the kinetoscope-pictures upon such screen and object, and illuminating at times the object with a light sufficient to obliterate the moving pictures where projected upon the object, and at other times illuminating the object only by the light and projection of the moving pictures.

In testimony whereof I have hereunto set my hand in the presence of two subscribing witnesses.

SARAH E. McMAHON.

Witnesses:
　THOMAS S. CRANE,
　L. LEE.